Oct. 7, 1947.  C. L. BAUSCH  2,428,645
SPECTACLE MOUNTING WITH SCREW LOCKING MEANS
Filed May 27, 1944
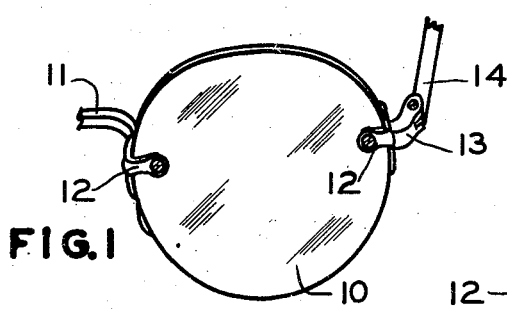
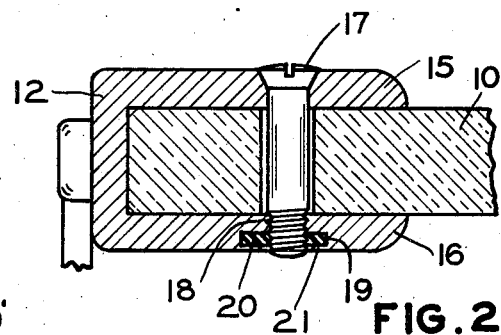
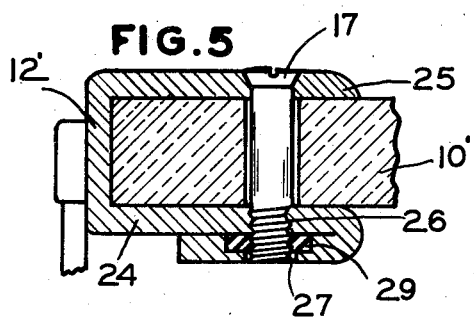
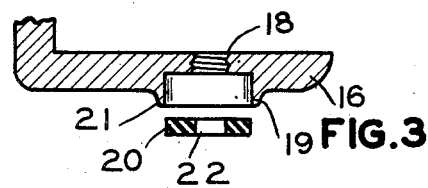
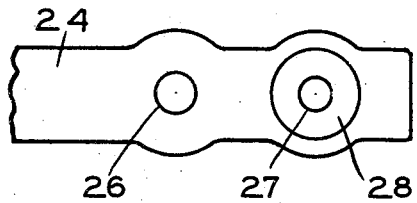
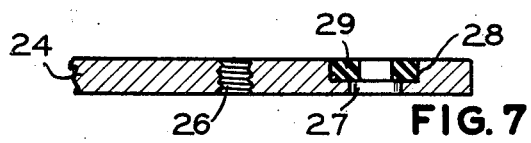
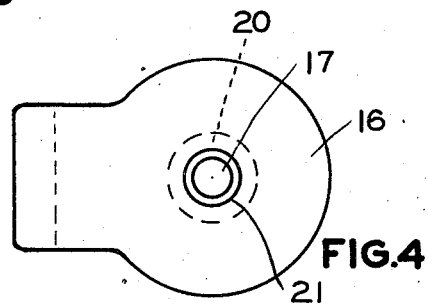
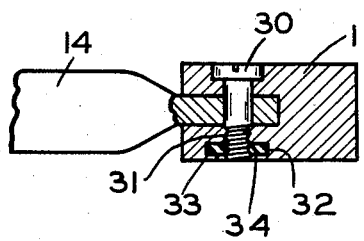
CARL L. BAUSCH
Inventor
Attorney Patented Oct. 7, 1947

2,428,645

UNITED STATES PATENT OFFICE 2,428,645

SPECTACLE MOUNTING WITH SCREW LOCKING MEANS

Carl L. Bausch, Brighton, N. Y., assignor to Bausch & Lomb Optical Company, Rochester, N. Y., a corporation of New York Application May 27, 1944, Serial No. 537,572

1 Claim. (Cl. 88—47)

This invention relates to spectacle mountings embodying screws and more particularly it has reference to means for locking such screws against accidental turning or rotation.

In spectacles and eyeglasses small screws are commonly used for holding together the various parts of the spectacle or eyeglass. Since the threaded portions are relatively small, great difficulty is experienced through the accidental loosening of the screws when the spectacles or eyeglasses are worn in service. Various methods and devices have heretofore been proposed to overcome this problem of loosened screws, but such proposals have generally been complicated in structure, difficult to use, and unsightly in appearance.

One of the objects of my invention is to provide improved means for locking spectacle screws which will be simple in structure, efficient in operation, and involve no extra loose pieces. My improved screw locking means for spectacles is of such a nature that it will permit repeated insertion and removal of the screws when necessary for making repairs. My improved device involves no extra loose washers or threaded nuts which are difficult to handle when assembling spectacles.

These and other objects and advantages reside in certain novel features of construction, arrangement, and combination of parts, as will hereinafter be more fully described and pointed out in the appended claim.

Referring now to the drawings:

Fig. 1 is a fragmentary front view of a spectacle embodying my invention.

Fig. 2 is an enlarged horizontal sectional view of a rimless spectacle strap embodying my invention.

Fig. 3 is a fragmentary view of a strap, with parts in exploded view, illustrating a step in the method of making my improved strap.

Fig. 4 is a face view of the assembled rear strap.

Fig. 5 is a sectional view of a strap embodying a modification of my invention.

Fig. 6 is a plan view of the rear strap shown in Fig. 5 before it is reversely folded.

Fig. 7 is a vertical sectional view of same.

Fig. 8 shows the application of my invention to a spectacle temple joint.

A preferred embodiment of my invention is shown in the drawings wherein I have shown in Fig. 1 a rimless spectacle lens 10, to the nasal edge of which is secured a bridge 11 by means of a strap 12. The temporal edge of the lens carries the endpiece 13, having the pivotally mounted temple 14, which is attached to the lens by means of a similar strap 12. The strap 12, embodying the front ear 15 and the rear ear 16, is secured to the lens 10 by means of the screw 17 which passes through an aperture in ear 15, an aperture in the lens 10, and extends into the threaded aperture 18 of the ear 16. The threaded aperture 18 is countersunk to provide a recess 19 in which is placed an elastic fiber washer 20. The washer 20 is held in the recess 19 by down-turned portions 21 formed integral with the ear 16. The diameter of the hole 22 in the washer 20 is slightly smaller than the diameter of screw 17 so that the threaded portion of the screw may be forced into binding engagement with the walls of the aperture 22 when the screw is threaded into position. Since the fiber washer 20 is formed of an elastic or yieldable material, the threaded portion of the screw 17 will be threaded into the washer 20 and forced into locking engagement therewith. This will lock the screw against accidental rotation while still permitting the screw to be removed and reinserted when making repairs.

In the modification shown in Fig. 5, the strap 12' is secured to the lens 10' by means of a screw 17' extending through apertures in the front ear 25 and in the lens 10' and secured in the threaded aperture 26 formed in strap 24. In the process of making this modification, the ear portion 24 of the strap would be blanked out of stock as shown in Fig. 6. A threaded aperture 26 is formed in the ear 24 and spaced therefrom another aperture 27 is formed with a countersink portion 28. An elastic fiber washer 29 is then placed in the countersink 28 and the end portion of the ear 24 is then reversely folded on itself so as to bring the aperture 27 and the aperture in the washer 29 in alignment with the threaded aperture 26. The washer 29 will thereby be secured in place, as clearly shown in Fig. 5. The screw 17' has its threaded portion forced into locking engagement with the walls of the aperture of the washer 29 and thereby locks the screw 17' against accidental turning.

In Fig. 8 I have shown my invention as applied to the endpiece 13 for locking the screw 30 which pivotally supports the temple 14. In this construction, the threaded aperture 31 of the endpiece 13 is provided with a countersink portion 32 for receiving the elastic fiber washer 33 which is held in position by down-turned portions 34 formed integrally with the endpiece 13. Since the threaded portion in the screw 30 is forced into locking engagement with the walls of the elastic fiber washer 33, the screw will be held against accidental rotation which might be brought about by the movement of temple 14 when in use.

From the foregoing, it will be apparent that I am able to attain the objects of my invention and provide a spectacle mounting which embodies improved means for locking screws against accidental turning. My invention may obviously be applied to various types and parts of spectacle and eyeglass frames and mountings and likewise goggles. My device does not involve the use of extra loose nuts or washers or the like and hence the assembly of mountings, embodying my invention, is greatly facilitated. With my construction the screw will be held in locking engagement with the fiber washer even if it is repeatedly removed and inserted as may be necessary when making repairs. Various other modifications can obviously be made without departing from the spirit of my invention.

I claim:

A spectacle mounting comprising a strap member positioned against the surface of a lens having an aperture, said strap member having a threaded aperture in alignment with the lens aperture, said member having a portion provided with a countersunk aperture, an elastic fiber washer positioned in the countersink, said portion being reversely folded and positioned against the strap member with the aperture in the washer in alignment with the other apertures, a screw passed through the lens aperture, threaded into the threaded aperture and threaded into the washer, a threaded portion of the screw being in locking engagement with the walls of the aperture in the elastic washer whereby the screw is locked against accidental turning.

CARL L. BAUSCH.

REFERENCES CITED

The following references are of record in the file of this patent:

UNITED STATES PATENTS

| Number | Name | Date |
| --- | --- | --- |
| 1,200,072 | Barnaby | Oct. 3, 1916 |
| 2,101,476 | Petersen | Dec. 7, 1937 |
| 1,982,047 | Dublin | Nov. 27, 1934 |
| 2,071,045 | Searles | Feb. 16, 1937 |
| 1,726,628 | Rennerfelt | Sept. 3, 1929 |
| 2,351,057 | Luce | June 13, 1944 |
| 329,615 | Andrews | Nov. 3, 1885 |